United States Patent [19]

Shotbolt

[11] Patent Number: 4,486,037
[45] Date of Patent: Dec. 4, 1984

[54] PIPE CONNECTORS

[76] Inventor: Keith Shotbolt, 62, Howards Wood Dr., Gerrards Cross, Buckinghamshire, England

[21] Appl. No.: 181,735

[22] Filed: Aug. 27, 1980

Related U.S. Application Data

[63] Continuation of Ser. No. 898,415, Apr. 20, 1978, abandoned.

[30] Foreign Application Priority Data

Jul. 6, 1977 [GB] United Kingdom ............... 28387/77

[51] Int. Cl.³ .............................................. F16L 27/04
[52] U.S. Cl. ..................................... 285/261; 285/263; 285/266; 285/367; 285/93
[58] Field of Search ............... 285/263, 261, 264, 267, 285/268, 269, 367, 266, 27, 166

[56] References Cited

U.S. PATENT DOCUMENTS

| 242,768 | 6/1881 | Frankenfield | 285/261 |
| 664,291 | 12/1900 | Reniff | 285/266 X |
| 888,288 | 5/1908 | Windemuller | 285/263 |
| 1,853,180 | 4/1932 | Ruot | 285/266 X |
| 2,421,691 | 6/1947 | Gibson, Jr. et al. | 285/266 X |
| 3,544,137 | 12/1970 | Contreras et al. | 285/261 |
| 3,722,926 | 3/1973 | Fukushima | 285/261 |
| 4,180,285 | 12/1979 | Reneau | 285/261 |

FOREIGN PATENT DOCUMENTS 1060203 6/1959 Fed. Rep. of Germany ...... 285/266

Primary Examiner—Thomas F. Callaghan
Attorney, Agent, or Firm—Lewis H. Eslinger

[57] ABSTRACT

A submarine ball and socket pipe connection employs male and female coupling members, of which the male member has an enlarged portion with concentric forward and rearward facing part-spherical external surfaces and the female member has a housing defining a part-spherical recess to receive said forward facing, part-spherical surface of the male member. The male member furthermore carries, slidably with relation thereto, a hub having a part-spherical surface to engage said rearward facing, part-spherical external surface of the male member, and means are provided for drawing said hub towards said housing to make the connection. The male member furthermore carries means biasing the hub towards the rearward facing part-spherical surface of the male member, from the rearward side thereof to assist in assembling the connection.

21 Claims, 6 Drawing Figures

PIPE CONNECTORS

This is a continuation of application Ser. No. 898,415, filed Apr. 20, 1978, now abandoned.

The present invention relates to pipe connectors which are especially useful when connecting misaligned pipes underwater. In particular the invention relates to a ball and socket pipe connection.

Ball and socket connectors are described in U.S. Pat. Nos. 3,874,706, and 4,040,650. However those ball and socket connectors tend to grip the rear external surface of the ball member radially and this provides little or no axial preload to counteract the separation force due to internal pressure.

It is an object of the present invention to provide a new pipe connection which consists of solely a male unit and a female unit to be brought together and clamped together by integral clamping means to compress the ball axially into the socket.

According to this invention there is provided a pipe connection for joining two pipes comprising first and second coupling members each of which is adapted to be attached at one end to one of the two pipes to be connected, the first coupling member having at its other end an enlarged portion with concentric forward and rearward facing part-spherical external surfaces, and the second coupling member having at its other end a housing with a part-spherical internal surface able to accept the forward facing part-spherical external surface of said enlarged portion in mating engagement; a hub which has a part-spherical internal surface which is slidingly engaged on the said rearward facing part-spherical external surface of said enlarged portion and is able to swivel about diametral axes of said enlarged portion before connection is made; means on said first coupling member to the rear side of the enlarged portion thereof to maintain the hub in aid sliding engagement on said enlarged portion; and means operable to pull the hub axially towards the housing of said second coupling member and then to hold it with said enlarged portion in mating engagement with said part-spherical internal surface of the housing.

In one preferred form of the invention, the hub has a part-spherical outer surface concentric with said part-spherical internal surface thereof. The means to maintain the hub in sliding engagement with said enlarged portion may comprise a thrust ring having a part-spherical inner surface mating with said outer surface of the hub, said thrust ring being fixed to the exterior of said first coupling member behind the hub to allow a close sliding fit between the hub and both the enlarged portion and the thrust ring. Advantageously the coefficient of friction between the hub and the thrust ring will be a minimum, either by suitable choice of material e.g. nylon, Delrin (Registered Trade Mark) or a surface layer containing PTFE or molybdenum disulphide, or by lubrication.

Alternatively, the means to hold the hub against said enlarged portion may be a compression spring which maintains a force biasing the hub forwards while still allowing said swivelling movement, with the spring force reaction provided by a sleeve fixed to a portion of the first coupling member behind and spaced from said enlarged portion.

As a third possibility, the means to maintain the hub in sliding arrangement with the enlarged portion may comprise a series of hydraulically interconnected pistons, which may be carried by the hub, and which react against a thrust shoulder, such that when the hub swivels on the enlarged portion some of the pistons retract and the hydraulic fluid behind them is pumped into diametrically opposite pistons which extend. As the hub swivels, the decrease in volume of the cylinders on the closing side is designed to be similar to the increase in volume on the opening side. Thus, the hub is maintained in said sliding relationship without the development of excessive clearance between the hub and the enlarged portion.

There may be occasions when the assembled pipe connection is required to swivel during use, but normally the enlarged portion will become clamped when the hub is pulled towards the housing, the pull being resisted by compression of the enlarged portion of said one coupling member. The amount of compression can be controlled by adjustment of the final position of the hub, but will obviously be increased as the hub approaches the housing. However, for connecting a submarine pipeline, the clamping action must usually be sufficient to prevent a swivelling motion of the enlarged portion relative to the housing for bending moments up to those which would cause yield of the pipe material. The maximum bending moement which can be applied before the pipe yields is given by the expression, $M_p = \sigma Z$, where $\sigma$ is the yield stress of the pipe material, and Z is the section modulus of the pipe. The bending moment to cause the enlarged portion of said first coupling member to swivel relative to the housing and hub is given by the expression, $M_c \simeq 2.2 \mu FD/\pi$, where $\mu$ is the coefficient of friction between the enlarged portion and the housing and hub, F is the normal component (i.e. radial to the sphere) of the clamping force exerted by the housing on the forward spherical surface, and by the hub on the rearward facing spherical surface of the enlarged portion, and D is the diameter of the spherical surfaces, assuming in this case that the forward and rear surfaces have equal radii. It is obviously advantageous if the value of $\mu$ is high to give maximum resistance to swivelling, and this may be obtained by choice of material, surface finish, and lack of lubrication.

The part-spherical surfaces are angled such that when the hub pushes the enlarged portion axially into the housing, the enlarged portion tends to be compressed radially in the manner of a double-cone gasket hub (such as the "AX" gasket hub available from Cameron Iron Works Inc.) used extensively in oil and gas wellheads. If the connection is required to be rigidly clamped, then there must be a compromise between the degree of flexibility of the enlarged portion to gain advantage of the "double-cone gasket effect", and the rigidity required to give a sufficiently high value of F to clamp the enlarged portion when the hub is pulled towards the housing. In order to obtain the optimum combination of clamping and sealing actions, it may be necessary to relieve the enlarged portion internally to increase its compressive flexibility, especially near the forward sealing area. Internal axial ribs may be added to aid the passage of spheres and cleaning pigs without increasing the compressive rigidity of the enlarged portion. Also, to improve the metal-to-metal seal between the mating surfaces of the enlarged portion and the housing, the radius of the forward facing part-spherical surface of the enlarged portion may be slightly less than the radius of the internal part-spherical surface of the housing (within the range 0.001 to 0.020 inches difference in radius) so that when the surfaces are pushed together the highest pressures are generated at the forward-most point of contact of the enlarged portion.

Secondary sealing, which would be active in the event of a scratch or of grit between the mating surfaces, could be provided by the installation of resilient sealing rings either in the housing or on the said enlarged portion in a position of mating surface contact.

It may be advantageous if the radius of curvature of the forward facing part-spherical surface of the enlarged portion is smaller than that of the rear facing spherical surface. The resulting reduced thickness section at the front of the enlarged portion is relatively flexible and aids sealing in the manner of an AX gasket, while the heavy rear section may help resist the separation force generated by internal pressure. The separation force is equal to the product of the pipeline pressure and the cross-sectional area enclosed by the seal at the front surface of the enlarged portion, and this is minimised when the radius of curvature of the forward spherical surface is a minimum.

If the connection is required to be rigidly clamped after initially mating the enlarged portion and housing, then a small gap must exist between the front face of the hub and the free end face of the housing, prior to actuation of the pulling means, in order to allow a perpetual axial preloading force to exist between the hub and the enlarged portion. In order to encourage the faces to adopt an alignment which is close to parallel before actuation of the pulling means, a plurality of spring-biased buffer plungers may be installed in the gap between the housing and hub, e.g. in the housing face, to contact the hub face lightly and to bias it parallel, provided that the hub is free to swivel.

An alternative method of bringing the faces into or close to parallel alignment would be to fit, on either the housing face or the hub face, a spacer ring the thickness of which could be selected so that the spacer ring almost touches the opposite face before actuation of the pulling means; such a spacer ring may also be used to limit the compression of the enlarged portion after actuation of the pulling means.

When connecting deep underwater pipelines it is advantageous to be able to perform the operation remotely. The clamp-hub method of joining pipes using only two screws, instead of the mutliple screws of a flange, is well known and marketed by a number of companies including Cameron Iron Works and the Gray Tool Company. A remotely actuated deep water connector utilising the clamp-hub method is described in paper no. OTC 2526 presented at the Offshore Technology Conference in 1976.

With the present invention, the means to pull the hub axially towards the housing may comprise a double screw clamp-hub system, similar to those in the references just described above, the housing and hub having extended angled rims of high conicity, generally between 5° and 30° to the major axis which rims are engaged by the clamp segments. The double screw mechanism has prepared ends on the screw shafts for rotation by two hydraulic motors of a tightening tool in which the motors turn at equal speed and are only engaged with the screw shafts of the connector when the clamp system is to be actuated. This mechanism is self-locking, and can be readily unscrewed to allow disconnection at a later date, provided that corrosion is controlled using sacrificial anodes, and possibly grease-filled caps over the threads. The clamp segments and screws are carried by the housing so that only two assemblies, the housing and clamp assembly on the one hand, and the enlarged portion and hub assembly on the other hand, are required to perform the connection. The main screws are supported in U-shaped brackets, which allow the main screws and nuts to be fitted and removed radially using smaller fixing screws which hold the nuts on the clamp segments. In other respects the clamping system is as described in the sales bulletin TT1130 of the Double-Bolt Hinged Closures marketed by the Tube Turn Division of the Chemetron Corporation. These closures are used extensively on large diameter oil and gas pipelines.

Alternatively, and for use at water depths where divers are able to work, the pulling means may comprise flange extensions on both the housing and hub with a plurality of studs and nuts fitted between them in order to pull the hub and housing together. In this case, the hub flange should be free to rotate around the first coupling member to permit alignment of the stud holes with the holes in the housing flange.

As a third alternative, the pulling means may comprise a large single nut with multiple internal circumferentially arranged cams mounted for rotation around the housing. The cams would co-operate with matching cams on the hub, and the hub would need to be keyed to prevent rotation around the enlarged portion. A screw is arranged so that when it is tightened the nut is caused to rotate and the cam surfaces pull the hub towards the housing. This mechanism is similar to the one described as the "Unibolt" coupling, marketed by the Thornhill-Craver Company.

In order that the present invention may be more readily understood, the following description is given, merely by way of example, reference being made to the accompanying drawings wherein.

Figure 1:
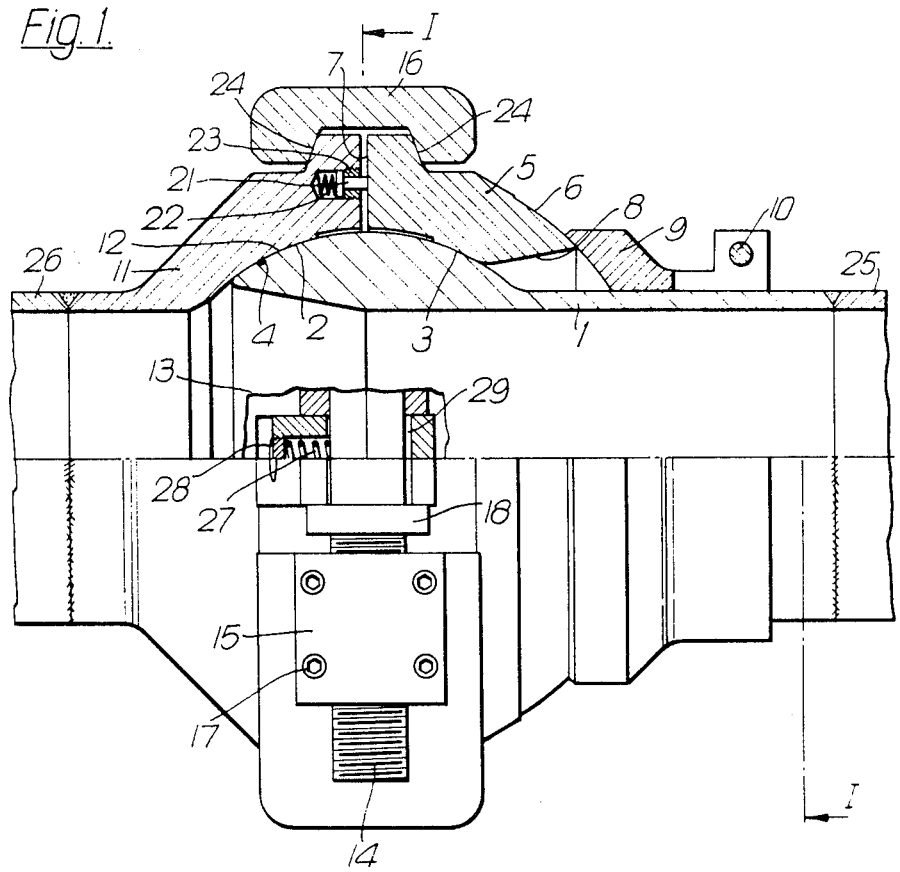
FIG. 1 is a longitudinal sectional view of a connector utilising clamp-hub type actuating means.
Figure 2:
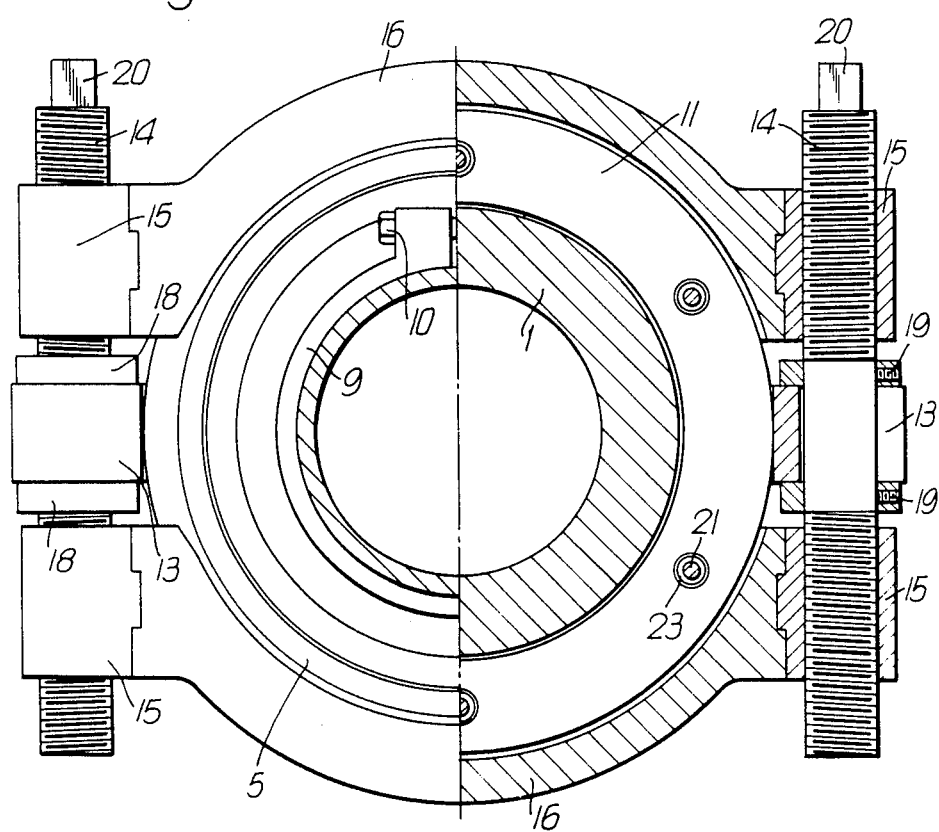
FIG. 2 is a cross-sectional view of the connector of FIG. 1, taken along line I—I of FIG. 1, but illustrated in a position 90 degrees out of phase in order to show one of the main screw assemblies in section.

The ball and socket pipe coupling of FIGS. 1 and 2 comprises a first coupling member 1 which has a through bore and which is connected at one end to a first pipe 25. At the end opposite pipe 25 the coupling member has a spherical enlarged portion at its other end with forward and rear facing part-spherical surface portions 2 and 3 respectively. The forward facing portion 2 carries a resilient sealing ring 4. A hub 5 is rotationally and nutationally engaged on the rear facing part-spherical surface 3 only, and has both a mating internal part-spherical surface and a concentric outer part-spherical surface 6. The hub 5 has a flat front face 7, positioned so that the entire hub 5 is on one side of a plane extending through the centre of the part-spherical surfaces, and a tapered bore 8 which is larger in diameter than the outside diameter of the cylindrical part of coupling member 1. The hub 5 is held in position by a thrust ring 9 which can be assembled on the member 1 before the hub is welded to pipe 25. The thrust ring 9 has an internal part-spherical surface arranged for sliding engagement with the radially outer surface 6 of the hub and is adjustable in position axially, using a clamp bolt 10, to obtain an easy sliding fit for the hub 5 between the thrust ring 9 and the rear surface 3 of the enlarged portion. The assembly comprising components 1 to 10 forms the "ball" part of the ball and socket connector.

A second coupling member, incorporating a housing 11, is welded at one end to a pipe 26 and has at its other end an internal part-spherical surface 12 which is able to accept the forward facing part-spherical surface 2 of the first coupling member 1 in mating engagement. Support brackets 13 are fixed to the housing 11 and carry double-ended main screws 14 which have a right hand thread at one end and a left hand thread at the other end. Clamp nuts 15 can be pre-assembled on the screws 14 before being attached to clamp segments 16 by small holding screws 17. Adjustment of the axial position of the main screws is by means of collars 18 which have gripping grub screws 19. The collars 18 maintain the clamp segments 16 equally spaced about the centre line when the screws 14 are simultaneously rotated at equal speeds by driving torques applied to squared ends 20 (FIG. 2) of the screws using a suitable tool such as a hydraulic wrench. Initially, the clamp segments 16 are in their outer positions.

When the pipe 25, with the "ball" assembly attached is required to be connected to the pipe 26, having the "socket" assembly attached, then the pipes may be misaligned up to about 10 degrees. The hub 5 may then be misaligned with respect to the housing by up to 20 degrees. As the forward facing surface 2 of the enlarged portion approaches the internal spherical surface 12 of the housing, a corner of the front face 7 of the hub will contact an adjacent part of the end face of the housing 11. As the approach continues the hub will swivel to align itself with the housing. The end face of the housing 11 contains six buffer plungers 21 which are spring-biased outwardly by compression springs 22 and held in position by hollow screws 23 through which the buffers pass. When the part-spherical surface 2 of the enlarged portion mates with the housing part-spherical surface 12, the buffer plungers 21 act to hold the hub face 7 parallel to the housing face while the clamp system 14, 15, 16, 17 is actuated. Correct rotation of the screws 14 pulls the clamp segments 16 tightly around the housing and hub, and conical surfaces 24 inside the clamp segments 16 apply a predominantly axial pull to draw the hub 5 towards the housing 11. This axial pull causes the internal part-spherical surface of the hub 5 and the housing 11 to apply a compressive load to the part-spherical surfaces 2 and 3 of the enlarged portion. The two diametrically opposite, double-ended clamp screws 14, each of which is oppositely-handed at its two ends are mounted in specially designed brackets on the housing portion 11 of the female clamping member in such a way that they are movable through a limited extent in a direction extending parallel to the longitudinal axis of the housing 11. To this end, the bracket 13 has a cylindrical recess extending in the direction parallel to the axis of the housing 11 and closed at the left-hand end, as viewed in FIG. 1 by a threaded plug 28 which provides the reaction member for a helical compression spring 27 whose other end abuts the plain central shank portion of double-ended screw 14. This same plain shank portion of the screw 14 sits in a flat-bottomed elongated slot of U-shaped cross-section formed in the bracket 13 and is normally biased to the right-hand side of that U-shaped slot to close off a gap 29 which can be seen in FIG. 1. However, in the clamped configuration of the connector (the configuration shown in FIG. 1) the housing 11 and the hub have been pulled together, resulting in leftward movement of each clamp segment 16, nuts 15 and screw 14 with respect to the bracket 13 (only the lower of which is shown in FIG. 1) which support the screw. This compresses the spring 27 and enables the screw 14 to be free of bending load and thus more readily able to absorb the tensile stress required to hold the clamp segments 16 sufficiently tightly around the conical flanges 24.

It will thus be appreciated that each screw 14 is supported by a respective one of the brackets 13 and that during tightening of the clamp the screws 14 are subjected solely to tensile strain even though there is a relative movement between the housing 11 carrying the two brackets 13, and the median transverse plane of the two clamp segments 16 which carry the respective pairs of nuts 15, as shown in FIG. 2.

Figure 3:
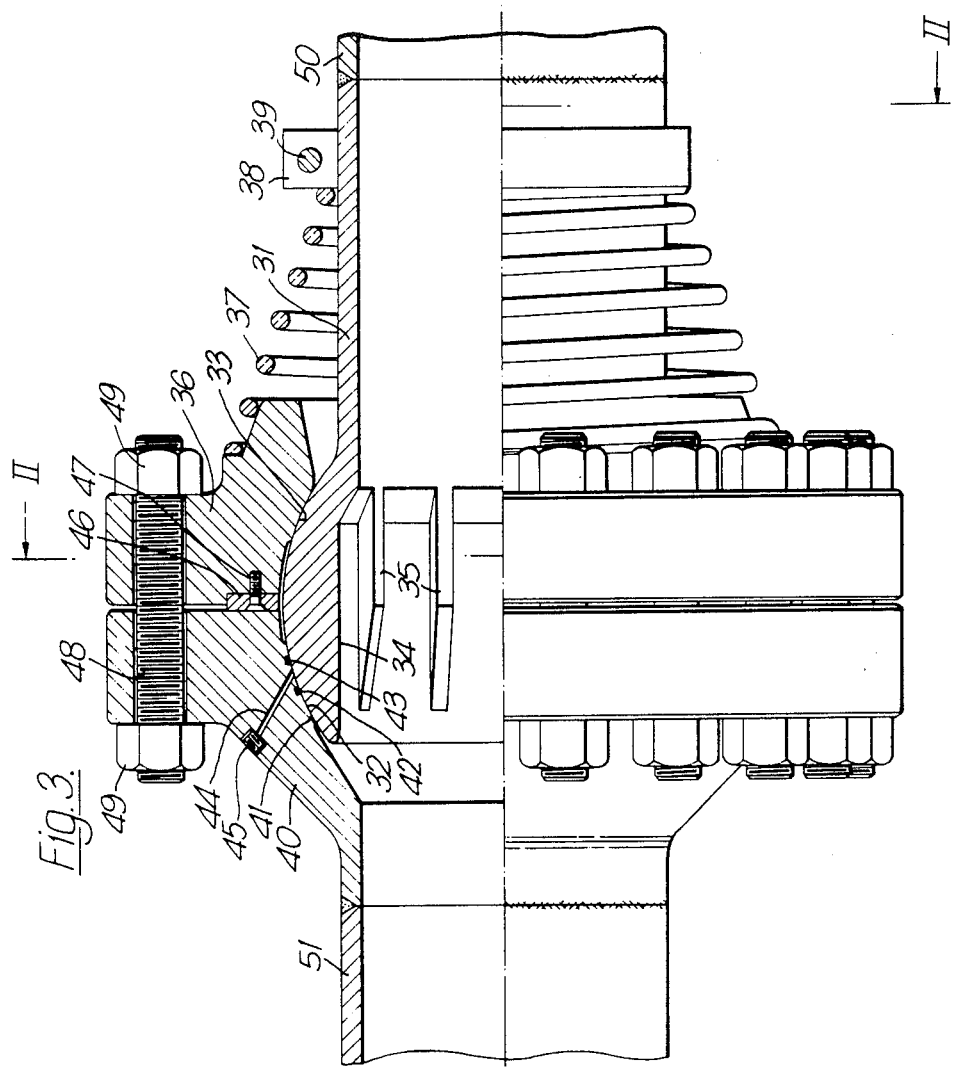
FIG. 3 is a longitudinal sectional view of a connector utilising flange type actuating means.
Figure 4:
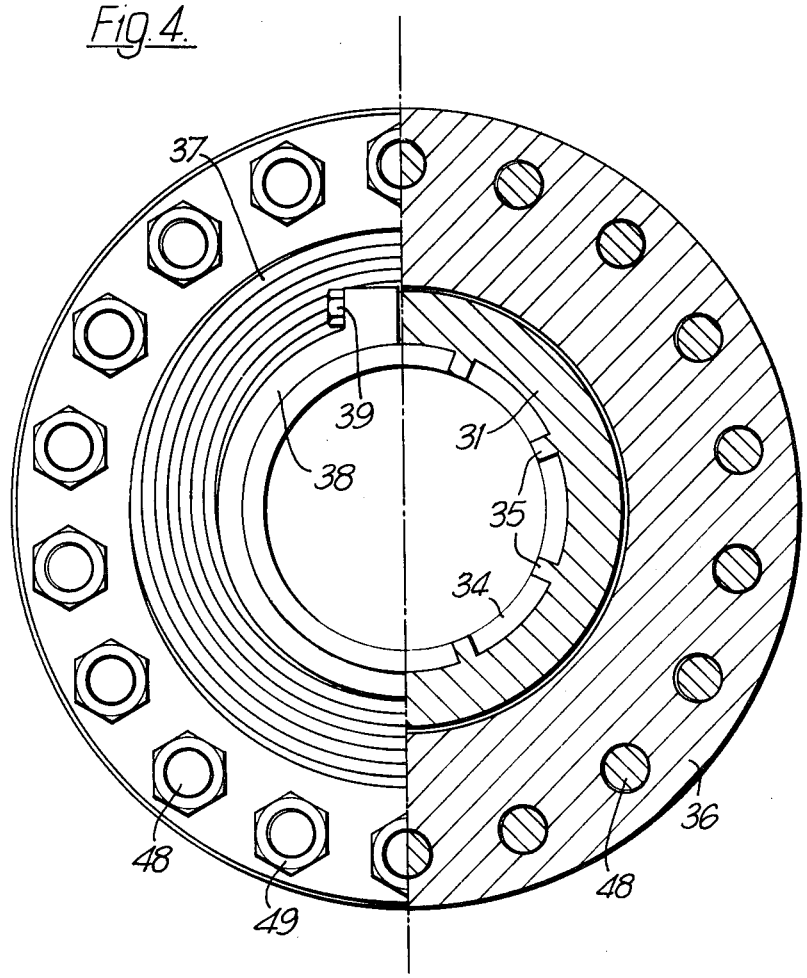
FIG. 4 is a cross-sectional view of the connector of FIG. 3, taken along line II—II but 90 degrees out of phase to show the clamping bolt of the spring reaction sleeve.

Referring now to the embodiment shown in FIGS. 3 and 4, a first coupling member 31 is attached to a pipe 50 at one end, in this case by welding and has at the other end an enlarged portion with forward and rearward facing part-spherical surfaces 32 and 33 respectively. The bore 34 in the coupling member 31 is increased in the region of the enlarged portion to increase the radial flexibility of the enlarged portion for sealing purposes, and has internal ribs 35 which may act as guides for spheres and cleaning pigs which may be used for pipeline maintenance. A hub 36 has a part-spherical internal surface and is mounted for sliding engagement on the rear facing spherical surface 33. The hub is maintained in contact with the enlarged portion by the forward force exerted by a compression spring 37 whose reaction is taken by a split sleeve 38, clamped to member 31 by a clamp bolt 39.

A second coupling member incorporating a housing 40 is attached at one end, in this case by welding, to a pipe 51 and has an internal part-spherical surface 41 at its other end, which is able to accept the forward facing part-spherical surface 32 of the first coupling member 31 in mating engagement. Resilient sealing rings 42 and 43 are mounted in housing 40 to seal between surfaces 41 and 32. A hole 44 allows a pressure test between seals 42 and 43 by connecting a source of fluid under pressure to port 45. When the two coupling members are brought together for purposes of connection, the hub 36 is helped into alignment with housing 40 by a spacer ring 46 which is attached to the hub 36 by screws 47. As the preload on the spring 37 is only very light, then the holes in the flange extension of the hub 36 can be aligned with the holes in the flange extension of the housing 40 by slidingly rotating the hub around member 31. Once the holes are aligned, studs 48 can be installed and nuts 49 can be tightened on the studs to pull the hub 36 towards the housing 40. Adjustment of the thickness of the spacer ring 46 allows adjustment of the amount of compression applied to the enlarged portion of member 31 as the studs are tensioned.

Figure 5:
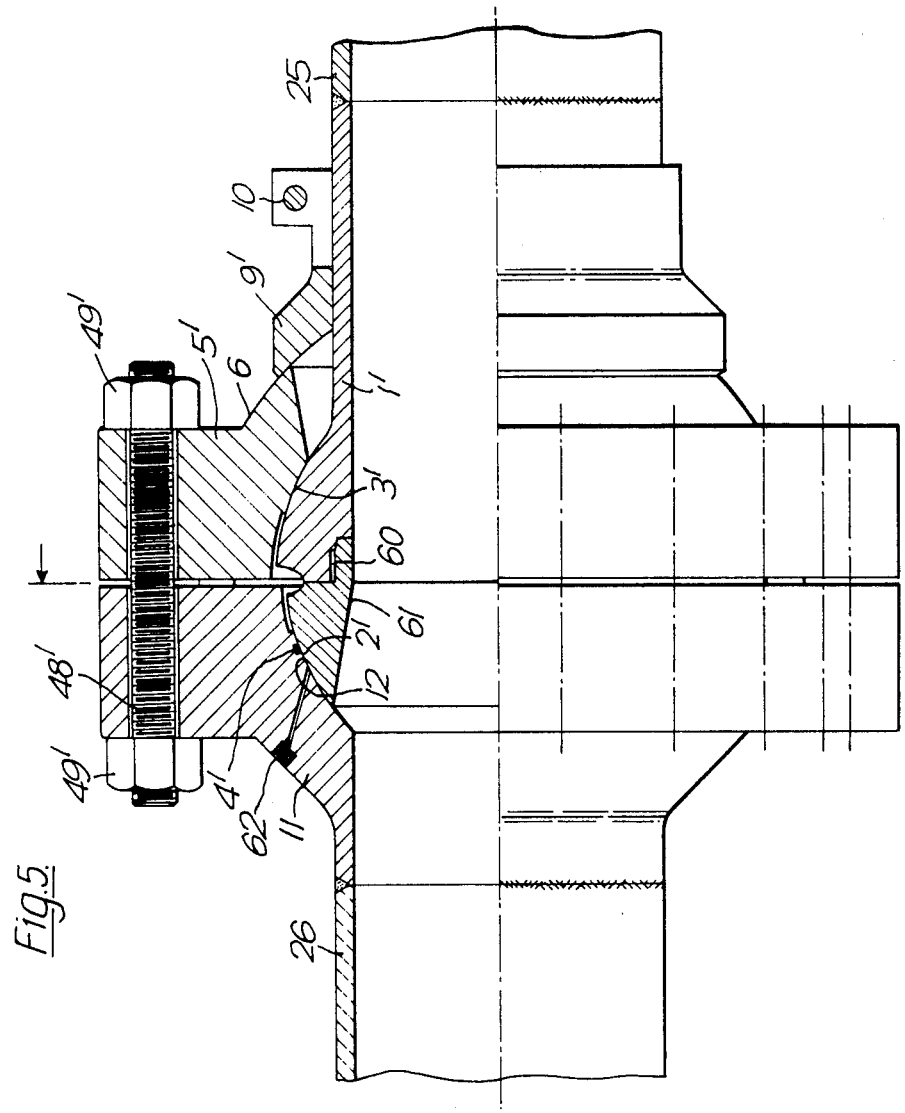
FIG. 5 is a longitudinal section of yet a further form of the connector.

FIG. 5 shows an alternative form of the pipe connection in which, as suggested above, the forward facing part-spherical surface 2' of the male connector 1' has a smaller radius of curvature than the rearward facing part-spherical surface 3' thereof.

In order to allow replacement of the major sealing surface of the enlarged portion of the male coupling member 1', the forward facing surface 2' is formed on an insert 61 which is both threadedly connected at 60 to the remainder of the enlarged portion on which the rearward part-spherical surface 3' is formed, and also simultaneously sealed thereto by a conical metal-to-metal seal in the manner of VAM tubing and casing. Thus, if the front sealing surface is damaged during transport or installation, it can be replaced.

The fixing system used in the FIG. 5 embodiment is the same as in FIG. 4, namely several clamp studs 48' with clamping nuts 49' at each end extend through clearance holes in the housing 11' and the hub 5', respectively. Alignment of the holes in the hub and housing is permitted by sliding rotation of the hub 5' with respect to the male coupling member 1', by virtue of a concave part-spherical thrust ring 9' as in the FIG. 1 embodiment.

In FIG. 5 there is a test port 62 positioned on the high pressure side of an elastomeric seal ring 4' for the purpose of testing the efficiency of the metal-to-metal seal between the contact area of the insert 61 and the housing 11' lying between the high pressure zone within the bore of the male coupling member 1' and the elastomeric sealing ring 4'.

This embodiment has the advantages that (a) the diameter of the circle defined by the sealing areas, and therefore the separation force due to internal pressure is kept to a minimum and also (b) it is this smaller radius section at which the sealing effect is achieved by elastic deformation of the metal and thus it is possible to renew this deformable zone, if necessary, simply by undoing threaded connection 60 to remove one threaded insert 61, and replacing it by another insert 61.

Although, in FIG. 5, the threading at 60 provides a metal-to-metal seal between the insert 61 and the remainder of the enlarged portion of the male coupling member 1', it is of course possible for a resilient sealing member (not shown) to be inserted between the insert and the remainder of the enlarged portion to provide a back-up seal, if required. The pipe connections described above thus have the advantages of actuation by conventional flange or clamp-hub methods which are self-locking and can be readily disconnected. Also, the connection is easier to keep clean, is less affected by any remaining dirt and grit, does not require such accurate machining, and is less affected than my co-pending British Patent Application No. 40755/75, corresponding to U.S. Pat. No. 4,139,221 by distortion of its parts.

Figure 6:
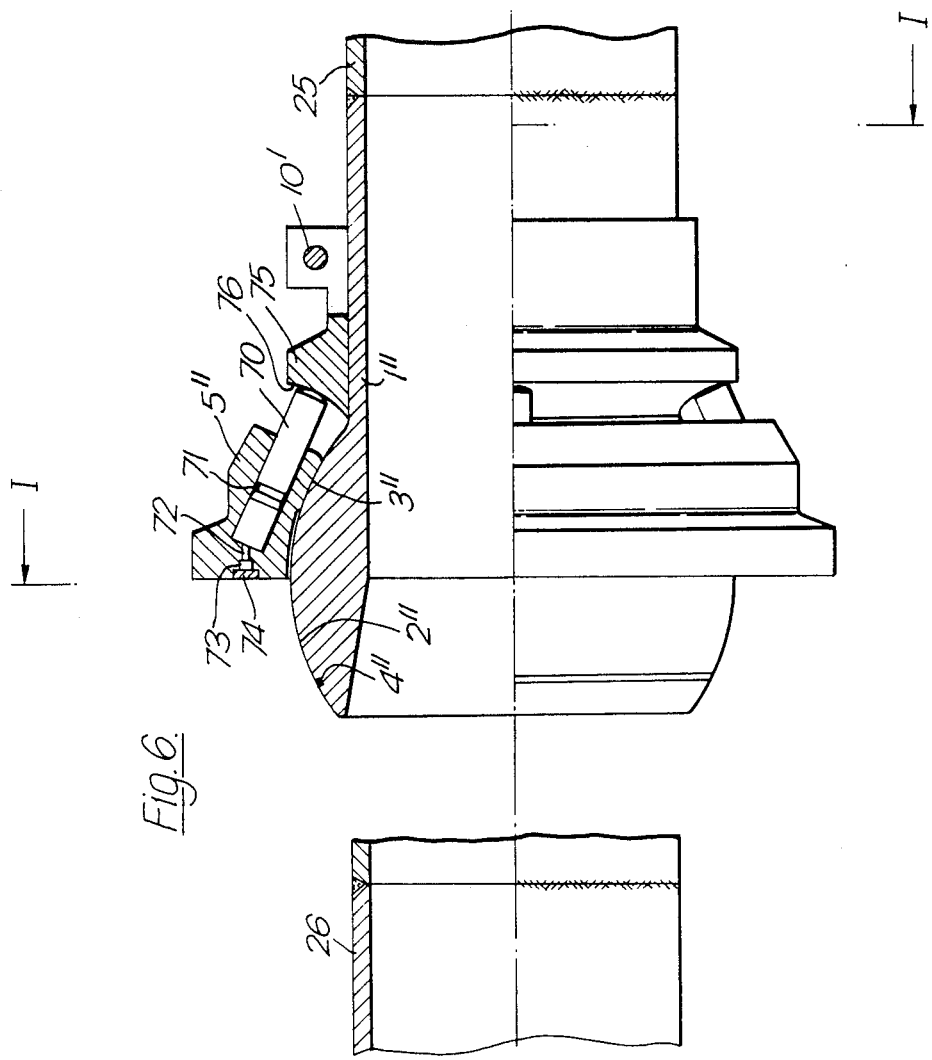
FIG. 6 is a longitudinal cross-section showing a still further form of the connector.

FIG. 6 shows a further embodiment of the coupling, with most of the female coupling member omitted for clarity. The means for maintaining the hub 5" in contact with the rearward facing part-spherical surface 3" of the enlarged portion of the male coupling member 1" in this case comprise a series of four pistons 70 each having an O-ring seal 71 positioned in a groove in the respective piston.

Each of the four pistons is slidable in a cylindrical recess which extends along a direction inclined to the axis of the male coupling member 1". Each of these cylindrical spaces is communicated by a longitudinally extending bore 72 with an annular groove 73 machined in the flat end face of the hub body. The groove 73 is closed off, after machining by a welded or braised sealing strip 74.

As the hub 5" is moved nutatingly on the enlarged portion of male member 1" the pistons 70 of each pair of diametrically opposed portions will move in opposition so that as one piston retracts into its associated cylindrical recess in the hub the diametrically opposite piston will move in the opposite direction along its cylindrical recess, and this linking of the opposed pistons will be by way of the bores 72 and the annular groove 73 allowing transfer of hydraulic oil from behind (i.e. to the left-hand side of piston 70 as viewed in FIG. 6) one of the pistons to the space behind the diametrically opposed piston. The rocking movement of the hub 5" will act on the two pistons in that one of the pistons will be pushed into its bore while the thrust force of the diametrically opposed piston on the cam ring 75 is relieved and thus hydraulic fluid may transfer along the interchange passages 72, 73 to cause the opposite piston 70 to extend at the same rate as the first mentioned piston is retracted.

During the nutation or rocking movement, at least two of the pistons 70 will be moving at any one time. If the axis about which the rocking takes place intersects the lines of action of the pistons of one pair then those pistons will not, of course, be affected. In any other orientation for the axis of rocking (up to but not including 90° displacement therefrom when the lines of action of the other two pistons will be intersected by the axis of rocking) each of the two pairs of pistons will move to a greater or lesser extent.

Because, during this rocking movement, the point of contact of a retracting or extending piston 70 with the cam ring 75 will move towards and away from the axis of the male coupling member 1, the cam face 76 is carefully machined to have the form of a frustum of a cusp, when viewed in cross-section, this cusp frustum being the generatrix of the cam surface (by generating rotation about the central axis of the male coupling member 1).

In order to facilitate bleeding of air from the hydraulic oil space behind the pistons and in the various bores 72 and the annular groove 73, a bleed nipple (not shown) is provided.

It is clear that once the hydraulic oil space has been bled of air, the hub 5" shown in FIG. 6 will be maintained thrust the rearwardly facing external part-spherical surface 3" of the enlarged portion of male member 1" and the functioning of this embodiment of hub will thus be analogous to that illustrated in FIG. 1 and in FIG. 5.

The various embodiments described above have the advantage over my U.S. Pat. No. 4,040,650 issued Aug. 9, 1977 that the hub member 5 is pulled axially towards the housing 11 on actuation of the clamping means, thereby achieving metal-to-metal sealing and gripping of the ball on both forward and rearward facing surfaces by an axial pre-load rather than by the radial pre-load evident from my said U.S. patent wherein the rearward facing part-spherical surface of the ball member was engaged by a wedging action driving part-spherical hub segments radially inwardly onto the ball which results in an inferior grip and provides no sealing action.

Although only three embodiments of the invention are shown in the Figures, there are many other variations of the invention which are still covered by the general principle of the invention as claimed. Also features described as part of the first embodiment may be advantageously used as features of the second, and are not limited to use only in the embodiments shown.

I claim:

1. A pipe connection for joining two pipes comprising:
    (a) first and second coupling members, said first coupling member having a bore axis,
    (b) means at one end of each of said coupling members to facilitate connecting the respective coupling member to one of the pipes to be joined,
    (c) an enlarged portion at the other end of said first coupling member, said enlarged portion having at least one diametrical axis, orthogonal to said line axis
    (d) concentric forward and rearward facing part-spherical external surfaces on said enlarged portion,
    (e) a housing at the other end of said second coupling member,
    (f) a part-spherical internal surface on said housing able to accept said forward facing part-spherical external surface of said enlarged portion in mating engagement,
    (g) a hub carried by said first coupling member,
    (h) a part-spherical forward facing internal surface on said hub slidingly engaged on said rearward facing part-spherical external surface of said enlarged portion at least before connection is made,
    (i) tensioning means effective to engage said hub and said housing and operable to pull said hub axially towards said housing of said second coupling member and to hold it with said enlarged portion in mating engagement with said part-spherical internal surface of said housing, and
    (j) means on said first coupling member between said one end and said enlarged portion thereof to maintain the hub in sliding contact with said rearward facing part-spherical external surface of said enlarged portion before operation of said tensioning means and effective to allow said hub to rotate about the bore axis of the first coupling member and to swivel about any orthogonal diametrical axis of said enlarged portion before and after immersion of the first coupling member in water and transportation to a depth where connection is made in a hyperbaric environment.

2. A pipe connection according to claim 1, wherein said means to maintain the hub in sliding engagement with said enlarged portion comprise a thrust shoulder secured to said first coupling member between said hub and said one end of said first coupling member and a series of pistons carried by one of said thrust ring and said hub and bearing against the other of said hub and said thrust ring, and means hydraulically interconnecting the pistons such that when said hub swivels on said enlarged portion some of said pistons retract and transfer hydraulic fluid behind said pistons to diametrically opposite pistons causing them to extend.

3. A pipe connection according to claim 1, wherein said forward facing part-spherical external surface on said enlarged portion of the first coupling member has a radius of curvature which is smaller than the radius of curvature of said rearward facing part-spherical external surface of said enlarged portion.

4. A pipe connection according to claim 1 and including separate concentric bore means in said enlarged portion of said first coupling member with an internal diameter of one of said bore means greater than the internal diameter of another of said bore means, said another bore means being disposed at said one end of said first coupling member.

5. A pipe connection according to claim 1, and including sealing rings disposed on one or more of said part-spherical surfaces for engagement with the respective part-spherical surface which, in the assembled condition of the pipe connection, will be adjacent thereto.

6. A pipe connection according to claim 1, wherein said first coupling member is formed of two connectible parts, one of which parts includes said forward facing part-spherical external surface and the other of which parts includes said rearward facing part-spherical external surface.

7. A pipe connection for joining two pipes comprising:
    (a) first and second coupling members, said first coupling member having a bore axis,
    (b) means at one end of each of said coupling members to facilitate connecting the respective coupling member to one of the pipes to be joined,
    (c) an enlarged portion at the other end of said first coupling member, said enlarged portion having at least one diametrical axis orthogonal to said bore axis,
    (d) concentric forward and rearward facing part-spherical external surfaces on said enlarged portion,
    (e) a housing at the other end of said second coupling member,
    (f) a part-spherical internal surface on said housing able to accept said forward facing part-spherical external surface of said enlarged portion in mating engagement,
    (g) a hub carried by said first coupling member,
    (h) a part-spherical forward facing internal surface on said hub slidingly engaged on said rearward facing part-spherical external surface on said enlarged portion at least before connection is made,
    (i) self-locking clamping means effective to engage said hub and said housing and operable to pull said hub axially towards said housing of said second coupling member and to hold it with said enlarged portion in mating agreement with said part-spherical internal surface of said housing, said self-locking means comprising at least one tangential screw mechanism connecting part-circular clamp segments, said tangential screw mechansim being operable to tension the associated clamp segments towards one another whereafter release of these clamp segments can only be effected by means of deliberate rotation of said tangential screw mechanism in the reverse direction, and
    (j) means on said first coupling member between said one end and said enlarged portion thereof to maintain the hub in sliding contact with said rearward facing part-spherical external surface of said enlarged portion before operation of said self-locking clamping means and effective to allow said hub to rotate about the bore axis of the first coupling member and to swivel about any orthogonal diametrical axis of said enlarged portion before and after immersion of the first coupling member in water and transportation to a depth where connection is made in a hyperbaric environment.

8. A pipe connection according to claim 7, wherein said tangential screw mechanism includes a double-ended screw having oppositely-handed threads at its ends, said oppositely-handed threads being engageable with respective ones of said associated clamp segments whereby rotation of said double-ended screw in one direction will simultaneously draw the said respective associated clamp segments towards one another.

9. A pipe connection for joining two pipes comprising:
(a) first and second coupling members, said first coupling member having a bore axis,
(b) means at one end of each of said coupling members to facilitate connecting the respective coupling member to one of the pipes to be joined,
(c) an enlarged portion at the other end of said first coupling member, said enlarged portion having at least one diametrical axis orthogonal to said bore axis,
(d) concentric forward and rearward facing part-spherical external surfaces on said enlarged portion,
(e) a housing at the other end of said second coupling member,
(f) a part-spherical internal surface on said housing able to accept said forward facing part-spherical external surface of said enlarged portion in mating engagement,
(g) a hub carried by said first coupling member,
(h) a part-spherical forward facing internal surface on said hub slidingly engaged on said rearward facing part-spherical external surface of said enlarged portion at least before connection is made,
(i) tensioning means effective to engage said hub and said housing and operable to pull said hub axially towards said housing of said second coupling member and to hold it with said enlarged portion in mating engagement with said part-spherical internal surface of said housing,
(j) means on said first coupling member between said one end and said enlarged portion thereof to maintain the hub in sliding contact with said rearward facing part-spherical external surface of said enlarged portion before operation of said tensioning means and effective to allow said hub to rotate about the bore axis of the first coupling member and to swivel about any orthogonal diametrical axis of said enlarged portion before connection is made, and
(k) means for interacting said hub with said housing during coupling of said first and second coupling members whereby as connection proceeds, possibly with initial angular misalignment between the hub and housing as said forward facing part-spherical external surface of said enlarged portion approaches said rearward facing part-spherical internal surface of said housing, said hub automatically aligns itself with said housing to eliminate any said angular misalignment.

10. A pipe connection for joining two pipes comprising:
(a) first and second coupling members, said first coupling member having a bore axis,
(b) means at one end of each of said coupling members to facilitate connecting the respective coupling member to one of the pipes to be joined,
(c) an enlarged portion at the other end of said first coupling member, said enlarged portion having at least one diametrical axis, orthogonal to said bore axis,
(d) concentric forward and rearward facing part-spherical external surfaces on said enlarged portion,
(e) a housing at the other end of said second coupling member,
(f) a part-spherical internal surface on said housing able to accept said forward facing part-spherical external surface of said enlarged portion in mating engagement,
(g) a hub carried by said first coupling member,
(h) a part-spherical forward facing internal surface on said hub slidingly engaged on said rearward facing part-spherical external surface of said enlarged portion at least before connection is made,
(i) a rearward facing face on said housing,
(j) a forward facing face on said hub,
(k) tensioning means effective to engage said hub and said housing and operable to pull said hub axially towards said housing of said second coupling member and to hold it with said enlarged portion in mating engagement with said part-spherical internal surface of said housing,
(l) means on said first coupling member between said one end and said enlarged portion thereof to maintain the hub in sliding contact with said rearward facing part-spherical external surface of said enlarged portion before operation of said tensioning means and effective to allow said hub to rotate about the bore axis of the first coupling member and to swivel about any orthogonal diametrical axis of said enlarged portion before connection is made, and
(m) means for interacting said rearward facing face with said forward facing face during coupling of said first and second coupling members whereby said hub is rotated about the bore axis of the first coupling member and swivelled about orthogonal diametrical axes of said enlarged portion while connection is made to thereby align said hub with said housing and enable actuation of said tensioning means.

11. A pipe connection according to claims 7, 8, 9 or 10, including an outer part-spherical surface on said hub concentric with said part-spherical internal surface thereof; and wherein said means to maintain the hub in sliding engagement with said enlarged portion comprise a thurst ring formed on the exterior of said first coupling member having a part-spherical inner surface conforming to said outer part-spherical surface of the hub, said thrust ring being disposed between said hub and said one end of said first coupling member to allow a close sliding fit between the hub and both the enlarged portion and said thrust ring.

12. A pipe connection according to claim 11, and including means for reducing the coefficient of friction between said hub and said thrust ring.

13. A pipe connection according to claim 12, wherein said means for reducing the coefficient of friction comprise a low friction material used for at least one of said thrust ring and the external part-spherical surface of said hub.

14. A pipe connection according to claim 13, wherein said low friction material is one of polytetrafluoroethylene and molybdenum disulphide, and is applied as a surface coating to the hub or the thrust ring.

15. A pipe connection according to claim 12, wherein said means for reducing the coefficient of friction comprise lubricant between the hub and the thrust ring.

16. A pipe connection according to claim 7 or 8, wherein said means to hold the hub against the said enlarged portion comprise a sleeve fixed to the exterior of said first coupling member between said hub and said one end of said first coupling member, and a compression spring having a first end engaging said sleeve and a second end engaging the hub to bias the hub forwards while still allowing said swivelling movement.

17. A pipe connection according to claim 9, wherein said housing and said hub have planar end faces which in the assembled configuration of the pipe connection lie adjacent one another, and wherein said means for interacting said hub with said housing comprise a plurality of spring-biased buffer plungers carried by one of said housing and said hub to contact lightly the said planar end face of the other of said housing and said hub, to bias said hub so that said planar end faces of the hub and the housing are parallel, after initial mating of said enlarged portion and said housing but before actuation of said tensioning.

18. A pipe connection according to claim 9, wherein said means for interacting said hub with said housing comprise a spacer ring carried by one of said hub and said housing to come between said hub and said housing in the clamped condition of said connection to limit the compression of said enlarged portion due to drawing together of the hub and the housing and their respective part-spherical surfaces.

19. A pipe connection for joining two pipes comprising:
  (a) first and second coupling members, said first coupling members having a bore axis,
  (b) means at one end of each of said coupling members to facilitate connecting the respective coupling member to one of the pipes to be joined,
  (c) an enlarged portion at the other end of said first coupling member, said enlarged portion having at least one diametrical axis orthogonal to said bore axis,
  (d) concentric forward and rearward facing part-spherical external surfaces on said enlarged portion,
  (e) a housing at the other end of said second coupling member,
  (f) a part-spherical internal surface on said housing able to accept said forward facing part-spherical external surface of said enlarged portion in mating engagement,
  (g) a hub carried by said first coupling member,
  (h) a part-spherical forward facing internal surface on said hub slidingly engaged on said rearward facing part-spherical external surface of said enlarged portion at least before connection is made,
  (i) tensioning means effective to engage said hub and said housing and operable to pull said hub axially towards said housing of said second coupling member and to hold it with said enlarged portion in mating engagement with said part-spherical internal surface of said housing,
  (j) a rearward facing outer part-spherical surface on said hub concentric with said part-spherical internal surface thereof, and
  (k) a thrust ring on the exterior of said first coupling member and having a forward facing part-spherical inner surface conforming to said rearward facing outer part-spherical surface of the hub, said thrust ring being disposed between said hub and said one end of first first coupling member to allow a close sliding fit between the hub and both the enlarged portion and said thrust ring to maintain the hub in sliding contact with said rearward facing part-spherical external surface of said enlarged portion before operation of said tensioning means and effective to allow said hub to rotate about the bore axis of the first coupling member and to swivel about any orthogonal diametrical axis of said enlarged portion before connection is made.

20. A pipe connection for joining two pipes comprising:
  (a) first and second coupling members, said first coupling member having a bore axis,
  (b) means at one end of each of said coupling members to facilitate connecting the respective coupling member to one of the pipes to be joined,
  (c) an enlarged portion at the other end of said first coupling member, said enlarged portion having at least diametrical axis orthogonal to said bore axis,
  (d) concentric forward and rearward facing part-spherical external surfaces on said enlarged portion,
  (e) a housing at the other end of said second coupling member,
  (f) a part-spherical internal surface on said housing able to accept said forward facing part-spherical external surface of said enlarged portion in mating engagement,
  (g) a hub carried by said first coupling member,
  (h) a part-spherical forward facing internal surface on said hub slidingly engaged on said rearward facing part-spherical external surface of said enlarged portion at least before connection is made,
  (i) tensioning means effective to engage said hub and said housing and operable to pull said hub axially towards said housing of said second coupling member and to hold it with said enlarged portion in mating engagement with said part-spherical internal surface of said housing,
  (j) a sleeve fixed to the exterior of said first coupling member between said hub and said one end of said first coupling member, and
  (k) a compression spring having a first end engaging said sleeve and a second end engaging the hub to bias the hub forwards to maintain the hub in sliding contact with said rearward facing part-spherical external surface of said enlarged portion before operation of said tensioning means and effective to allow said hub to rotate about the bore axis of the first coupling member and to swivel about any orthogonal diametrical axis of said enlarged portion before connection is made.

21. An apparatus for connecting two pipes together, comprising:
  (a) a spherical ball having an axial passage therethrough and adapted to be joined in fluid communication with a first pipe;
  (b) a receptacle means having an axial passage therethrough and formed of a female cavity having a surface matching that of said ball which surface is less than a hemisphere and which encircles said ball by at least 180 degrees, said receptacle means adapted to be joined in fluid communication with a second pipe;
  (c) clamping means for holding said ball in said receptacle means and aligning the axial passages thereof to enable fluid communication between the first and second pipes;
  (d) said clamping means securing said ball in said receptacle means by clamping said ball on its outer surface at a location on said ball on the exposed side opposite the hemisphere in said receptacle means and wherein said clamping means includes:
(1) a circular first ring around said ball having a diameter enabling it to contact said ball without passing over said ball;
(2) an external protruding lip on said receptacle means;
(3) means for locking said ring to said lip wherein said locking means comprises
(4) an encircling second ring having a pair of spaced, internally directed shoulders which are spaced to encircle and abut said first ring and said lip in a side-by-side relationship; and said clamping means further comprises:
 (a) hydraulic cylinder means;
 (b) piston means in said cylinder means;
 (c) piston rod means connected to said piston means; and
 (d) first means connected to said piston rod means, said first means moving first ring to a position contacting said ball opposite said receptacle.

* * * * *